(12) United States Patent
Rajagopalan (10) Patent No.: US 10,555,141 B2
(45) Date of Patent: Feb. 4, 2020

(54) NETWORK DEVICE SUBSCRIPTION MANAGEMENT

(71) Applicant: Aruba Networks, Inc., Sunnyvale, CA (US)

(72) Inventor: Gokul Rajagopalan, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/338,767

(22) Filed: Oct. 31, 2016

(65) Prior Publication Data
US 2018/0124585 A1    May 3, 2018

(51) Int. Cl.
*H04W 4/24* (2018.01)
*G06F 9/50* (2006.01)
(Continued)

(52) U.S. Cl.
CPC ............ *H04W 4/24* (2013.01); *G06F 9/5055* (2013.01); *H04L 43/0876* (2013.01);
(Continued)

(58) Field of Classification Search
CPC ........ G06Q 20/12; G06Q 30/02; G06Q 20/06; G06Q 20/29; G06Q 20/367; G06Q 20/40; G06Q 20/28; G06Q 20/32; H04L 12/1467; H04L 43/0876; H04L 67/42; H04M 15/772; H04W 4/24; H04W 28/24; H04W 88/02; H04W 88/08
See application file for complete search history.

(56) References Cited

U.S. PATENT DOCUMENTS 7,809,813 B2    10/2010    Ma et al.
2004/0215577 A1*  10/2004  Mitsuda ............... G06Q 20/085
                                                     705/77
(Continued)

FOREIGN PATENT DOCUMENTS

EP    1276035 A2    1/2003

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE, USA.
(Continued)

*Primary Examiner* — Quoc Thai N Vu
(74) *Attorney, Agent, or Firm* — Brooks, Cameron & Huebsch, PLLC (57) ABSTRACT

Example implementations relate to network device subscription management. For example, a non-transitory machine-readable medium may store instructions executable by a processor to cause the processor to receive a selection of a network device for subscription management, and receive a selection of a service subscription for the network device and a duration of the service subscription. Moreover, the system may include instructions to determine a service subscription token value based on the selection of the network device, the service subscription, and the duration of the service subscription, and provision the network device with the service subscription for the duration responsive to allocation of the determined service subscription token value.

17 Claims, 4 Drawing Sheets

(51) Int. Cl.
*H04L 12/26* (2006.01)
*H04L 29/06* (2006.01)
*H04W 88/02* (2009.01)
*H04W 88/08* (2009.01)

(52) U.S. Cl.
CPC ...... *H04L 67/42* (2013.01); *G06F 2209/5014* (2013.01); *H04W 88/02* (2013.01); *H04W 88/08* (2013.01)

(56) References Cited

U.S. PATENT DOCUMENTS

| | | | | |
|---|---|---|---|---|
| 2004/0236843 | A1* | 11/2004 | Wing | H04L 29/06 709/219 |
| 2006/0140348 | A1* | 6/2006 | Wallace | G06Q 10/10 379/29.01 |
| 2007/0203714 | A1* | 8/2007 | McEnroe | G06Q 30/0601 705/26.1 |
| 2012/0317224 | A1* | 12/2012 | Caldwell | H04L 45/745 709/217 |
| 2015/0363724 | A1 | 12/2015 | Chatterjee et al. | |

OTHER PUBLICATIONS

Wi-Fi Alliance, "Wi-Fi Peer-to-Peer (P2P) Technical Spec. V. 1.5", Aug. 4, 2014, 13 pages, WiFi Alliance, USA.

Wi-Fi Alliance, "Wi-Fi Certified Wi-Fi Direct: Personal, portable Wi-Fi to connect devices anywhere, anytime", Sep. 2014 8 pages, WiFi Alliance, USA.

IEEE Computer Society, "IEEE Standard for Air Interface for Broadband Wireless Access Systems; IEE Std 802.16-2012", Aug. 17, 2012, 3 pages, IEEE, USA.

Bluetooth, "Specification of the Bluetooth System", Dec. 2, 2014, 3 pages, Covered Core Package version 4.2, Bluetooth SIG Inc., USA.

IEEE Computer Society, "IEEE Standard for Local and Metropolitan Area Networks: Overview and Architecture; IEEE Std 802-2014", Jun. 12, 2014, 18 pages, IEEE, USA.

Wikipedia, https://en.wikipedia.org/wiki/Internet_Protocol, "Internet Protocol", Jan. 1, 2015, 6 pages, Wikipedia, USA.

USB Technology, http://www.usb.org/developers/docs/, "USB 3.1 Specification", Jul. 26, 2013, 37 pages, USB Implementers Forum Inc, USA.

Wikipedia, https://en.wikipedia.org/wiki/Asynchronous_Transfer_Mode, "Asynchronous Transfer Mode", Dec. 31, 2014, 11 pages, Wikipedia, USA.

* cited by examiner

FIG. 1

| TOTAL TOKENS 5005 | USED 383 | AVAILABLE 4622 | EXPIRING IN 90 DAYS 0 | ADD KEY |

| SUBSCRIPTION KEYS | | | | |
|---|---|---|---|---|
| NAME | START DATE | EXPIRES ON | SERVICE TOKENS | USED |
| CN00000100 | 05/29/2015 | 06/28/2020 | 5 | 0 |
| EZJG7NVHDES4BSBK | 03/10/2016 | 12/31/2017 | 5000 | 383 |

| DEVICE TYPE | COUNT | NETWORK SERVICE |
|---|---|---|
| ACCESS POINTS | 150 | CONGESTION DIAGNOSTICS (2 TOKENS/AP); CONNECTIVITY ANALYTICS (1 TOKEN/AP) |
| SWITCHES | 0 | |
| CONTROLLERS | 0 | |

DURATION: 1 YEAR

NETWORK DEVICE SUBSCRIPTION MANAGEMENT

BACKGROUND

Network services may be supplied by a service provider, namely, a vendor. Such network services may include, services hosting a number of applications, and/or services hosting a computing platform including, for example, operating systems, hardware, and storage, among others. Network services may be provided as a service for implementation on various hardware components within a network.

DETAILED DESCRIPTION

Network devices may be provisioned with different network services. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, a network service refers to instructions executed at the network application layer and/or above, that provide data storage, manipulation, presentation, communication or other capability which may be implemented using a client-server or peer-to-peer architecture. Moreover, as used herein, to provision a network device refers to installing, preparing, and/or otherwise equipping a network device with instructions to allow it to provide particular network services. Also, as used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

While a particular network device may be provisioned for a particular network service, each type of network device may use a different type of service subscription. Similarly, each network service may use a different type of service subscription. As used herein, a service subscription refers to a licensing and delivery model in which instructions to execute a particular network service may be licensed on a subscription basis while being centrally hosted. Service subscription models using different service subscriptions for each device type and each individual network service may be complex and undesirable from a usability perspective. Similarly, users may be unaware of what network service may be most beneficial for their organization, and/or what numbers and types of network devices they may use to install such network services. Moreover, users may wish to reallocate service subscriptions over time in accordance with the changes in network devices within their organization, and/or as new and/or updated network services become available.

The present disclosure relates to service provisioning of network devices. More particularly, the present disclosure describes a system where an alternate currency, referred to as "service subscription tokens", may be created for managing services which may be deployed on network devices. Each unit of currency, e.g., each service subscription token, may be assigned to different devices within the network, and each network device may be provisioned with different network services, using the service subscription tokens. In such a way, different network devices within a network may be provisioned with different network services over time, thereby changing service subscription usage within the network.

Figure 1:
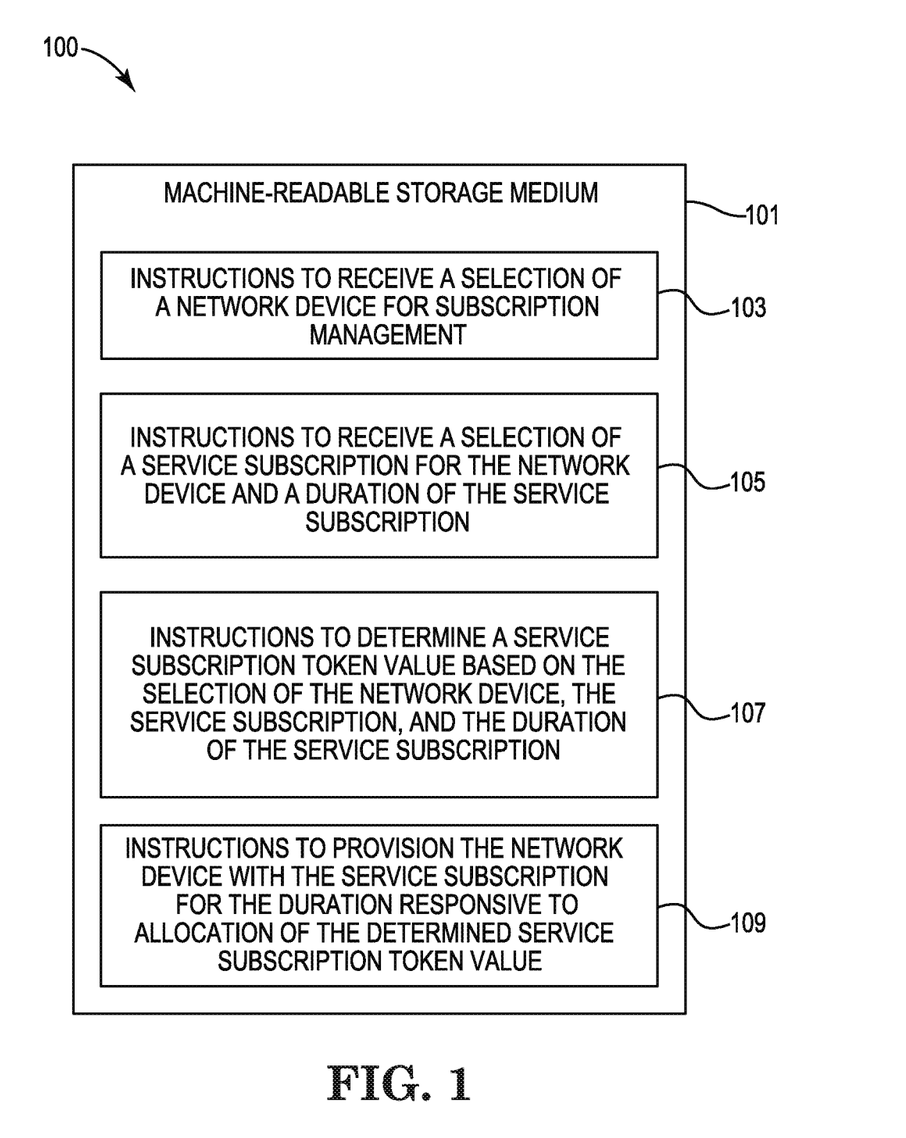
FIG. 1 illustrates an example environment, consistent with the present disclosure.

FIG. 1 illustrates an example environment 100, consistent with the present disclosure. As described herein, the components illustrated in FIG. 1 may perform a number of functions related to network device subscription management. Although the following descriptions refer to a single processing resource and a single machine-readable storage medium 101, the descriptions may also apply to a system with multiple processing resources and multiple machine-readable storage mediums. In such examples, the environment 100 may be distributed across multiple machine-readable storage mediums and multiple processing resources. Put another way, the instructions executed in the environment 100 may be stored across multiple machine-readable storage mediums and executed across multiple processing resources, such as in a distributed or virtual computing environment.

As illustrated in FIG. 1, the environment 100 may comprise a non-transitory machine-readable storage medium 101 storing machine readable instructions to cause a processing resource (not illustrated in FIG. 1) to perform a number of operations relating to network device subscription management. The processing resource may be a central processing unit (CPU), microprocessor, and/or other hardware device suitable for retrieval and execution of instructions stored in machine-readable storage medium 101.

The environment 100 may include instructions 103 stored in the non-transitory machine-readable storage medium 101 and executable by the processing resource to receive a selection of a network device for subscription management. That is, instructions 103 may cause a processing resource to receive, from a user, a selection of a network device or a plurality of network devices for subscription management. Examples of network devices may include a gateway, a router, a network bridge, a modem, a wireless access point, a networking cable, a line driver, a switch, a hub, and a repeater, among other examples. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. Examples of network devices may also include hybrid network devices such as multilayer switches, protocol converters, bridge routers, proxy servers, firewalls, network address translators, multiplexers, network interface controllers, wireless network interface controllers, integrated services digital network (ISDN) terminal adapters and other related hardware. Moreover, as used herein, subscription management refers to management of licenses for network services to be deployed on network devices. For example, a user in a particular network may purchase licenses for a plurality of network services to be deployed on a plurality of network devices, as described herein. As used herein, a network service refers to instructions executed at the network application layer and/or above, that provide data storage, manipulation, presentation, communication or other capability which may be implemented using a client-server or peer-to-peer architecture. Examples of network services may include a connectivity analytics service, and a network congestion diagnostics service, among others.

A user may request (e.g., purchase) a subscription for a network service for a defined period of time. That is, the user may request a license to use a network service for a specified length of time. Although, as described herein and in accordance with the present disclosure, the user may purchase a service subscription token which may be used to purchase subscriptions for different services and/or different devices. As used herein, a service subscription token refers to an alternate currency that may be purchased by a user of a network, and which allows the user to license a network service or a plurality of network services for a network device or a plurality of network devices. Each unit of currency, e.g., each service subscription token, may be assigned to different devices within the network, and each device may be provisioned with different services, using the service subscription tokens. Moreover, one service subscription token may be used and reused, by changing the provisioning of the various service subscription tokens.

Put another way, in accordance with the present disclosure, service subscription tokens may serve as an alternate currency for network device subscription management. In such a manner, service subscription tokens may be used across multiple devices, and may be used across multiple services.

The environment 100 may include instructions 105 stored in the non-transitory machine-readable storage medium 101 and executable by the processing resource to receive a selection of a service subscription for the network device and a duration of the service subscription. As described herein, a particular service subscription token may be used to purchase a subscription for a particular service for a particular network device, for a defined period of time. For instance, a user may purchase a subscription for a connectivity analytics service to be applied to an access point for a one year period. The defined one year period may be referred to as the duration of the service subscription.

The environment 100 may include instructions 107 stored in the non-transitory machine-readable storage medium 101 and executable by the processing resource to determine a service subscription token value based on the selection of the network device, the service subscription, and the duration of the service subscription. In some examples, a plurality of network services may be purchased for a single network device, or a plurality of network devices. While each network service may have a same service subscription token value, examples are not so limited, and each network service may have a different service subscription token value. As used herein, a service subscription token value refers to a "cost" of a particular network service, in service subscription tokens. For example, a first network service may cost one (1) service subscription token, whereas a second network service may cost five (5) service subscription tokens. As described further herein, a combined service subscription token value may be determined for a plurality of services, and/or a single service for a plurality of network devices. Moreover as described further herein, each service subscription token may correspond to a randomly generated subscription key that is valid for the duration of the service subscription.

The environment 100 may include instructions 109 stored in the non-transitory machine-readable storage medium 101 and executable by the processing resource to provision the network device with the service subscription for the duration responsive to allocation of the determined service subscription token value. As used herein, to provision a network device refers to installing, preparing, and/or otherwise equipping a network device with instructions to allow it to provide particular network services.

In some examples, the environment 100 may include instructions to receive a selection of a plurality of different service subscriptions for the network device and a duration of each of the plurality of different service subscriptions, and determine a combined service subscription token value for the plurality of different service subscriptions, wherein a first service subscription token value is different than a second service subscription token value.

In some examples, the service subscription is a first service subscription provisioned at a first time point, the medium including instructions to receive a selection of a second service subscription for the network device at a second time point subsequent to the first time point, apply the allocation of the service subscription token value to the second service subscription instead of the first service subscription for a remainder of the duration, and provision the network device for the second service subscription.

In some examples, the network device is a first network device the medium including instructions to receive a selection of a second network device for subscription management apply the allocation of the service subscription token value to the second network device instead of the first network device, and provision the second network device for the service subscription for a remainder of the duration.

Figure 2A:
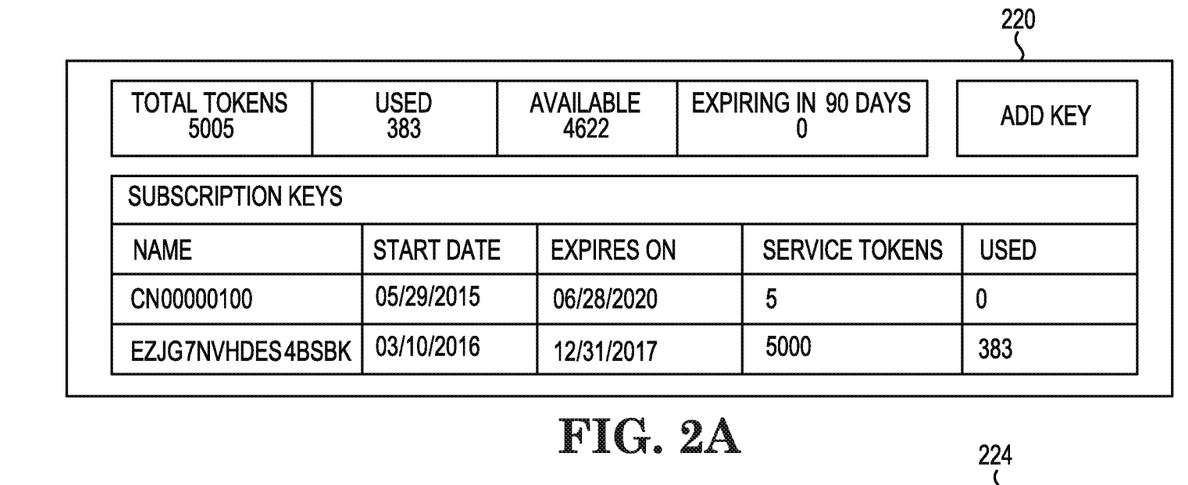
FIG. 2A illustrates an example screenshot of an example subscription management system, consistent with the present disclosure.
Figure 2B:
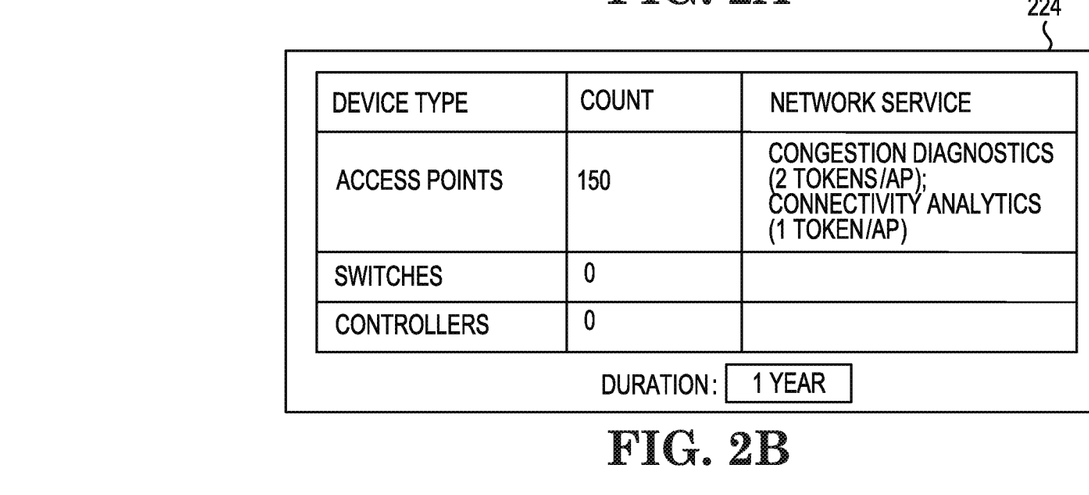
FIG. 2B illustrates an example screenshot of an example subscription management system, consistent with the present disclosure.

FIG. 2A illustrates an example screenshot 220 of an example subscription management system, consistent with the present disclosure. Similarly, FIG. 2B illustrates an example screenshot 224 of an example subscription management system, consistent with the present disclosure. As used herein, a subscription management system refers to a centrally managed system whereby service subscription tokens, network service licenses, and network devices may be regulated.

As illustrated in FIG. 2A, the subscription management system may maintain a number of subscription keys issued to a particular user. For instance, as illustrated in FIG. 2A, the subscription management system may indicate that the user has a total of 5005 licenses, that 383 are used, and 4622 are available. The subscription management system may recite a subscription key of CN00000100, which has a start date of May 29, 2015, and an end date of Jun. 28, 2020. Moreover, subscription key may grant the user 5 licenses, or 5 service subscription tokens. Put another way, when a user purchases a subscription, a subscription key may be generated which defines the term of the subscription, and the "value" of the subscription, in terms of service subscription tokens.

In another example, a user may purchase a subscription, and a separate subscription key may be generated, EZJG7NVHDES4BSBK, as illustrated in FIG. 2A. The EZJG7NVHDES4BSBK subscription key may have a start date of Mar. 10, 2016, and an end date of Dec. 31, 2017, and have a value of 5000 service subscription tokens. Each of the 5000 service subscription tokens for subscription key EZJG7NVHDES4BSBK may be applied to a different network device and a different network service. As such, a summary of the number of service subscription tokens for subscription key EZJG7NVHDES4BSBK may be maintained, as illustrated in FIG. 2A. That is, while subscription key EZJG7NVHDES4BSBK is associated with 5000 service subscription tokens, 383 may be applied to a network device and network service.

Also, as illustrated in FIG. 2A, the subscription management system may allow a user to select "add key", to add a subscription key. In such a manner, users may purchase additional service subscription tokens for assignment to additional network devices and network services.

As illustrated in FIG. 2B, service subscription tokens may be assigned to particular network devices and particular network services. For example, as illustrated in FIG. 2B, a user may specify a total number of a particular network device type, to provision with a particular network service and/or network services. That is, the user may specify that 150 access points are to be provisioned, 0 switches are to be provisioned, and 0 controllers are to be provisioned. Similarly, the user may select, such as via a dropdown menu, a type of network service to apply to the access points. For instance, the user may specify that a congestion diagnostics network service and a connectivity analytics network service are to be applied to each of the 150 access points. As illustrated in FIG. 2B, the connectivity analytics network service may have a different service subscription token value than the analytics network service. That is, the congestion diagnostics network service may have a service subscription token value of 2 tokens per access point, whereas the connectivity analytics network service may have a service subscription token value of 1 token per access point. Moreover, the user may specify that the term for the network services illustrated in screenshot 224, may be for a 1 year term. Again, the duration of the service subscriptions may be selected from a dropdown menu, may be defined in a text box, and/or by other entry methods. Once the device type, the count, the network service and/or network services, and the duration have been defined, a combined service subscription token value may be determined for the subscriptions illustrated in screenshot 224. For instance, assuming that the congestion diagnostics network service costs 2 tokens, per access point, per year, and the connectivity analytics network service costs 1 token, per access point, per year, then the combined service subscription token value for the subscription illustrated in FIG. 2B may be 450 tokens (i.e., 150 tokens*2 for congestion diagnostics, and 150 tokens for connectivity analytics). A subscription key may be issued for the subscription illustrated in FIG. 2B, and managed as illustrated in FIG. 2A.

Although examples herein describe a process for adding subscription keys, and allocating unused service subscription tokens, examples are not so limited. For example, a service subscription token used for a first network service and/or for a first network device, may be removed and applied to a different network service and/or for a different network device. For instance, a user may specify a first device-service provisioning, as illustrated in FIG. 2B, where each access point is provisioned with congestion diagnostics and connectivity analytics for a 1 year term. However, within that one year term, this usage of service subscription tokens may be modified such that 100 access points are provisioned with congestion diagnostics and connectivity analytics, resulting in a second device-service provisioning. As used herein, a device-service provisioning refers to an assignment of a network service or plurality of network services to an particular device type within the network for a defined period of time. A particular device-service provisioning may be defined by a particular subscription key, as described herein. That is, each subscription key may be associated with a particular device-service provisioning for a particular period of time. In another example, a new network service may be developed and offered. As used herein, a new network service refers to a network service not previously offered to users of the network. For instance, the device-service provisioning illustrated in FIG. 2B may be replaced with a subsequent device-service provisioning, such as a third device-service provisioning. The third device-service provisioning may specify that the 150 access points may each be provisioned with congestion diagnostics and connectivity analytics version 2, e.g., the "new" network service available. In such a manner, service subscription tokens applied to particular network devices and/or particular network services may be dynamically revised and reapplied, as needed.

Figure 3:
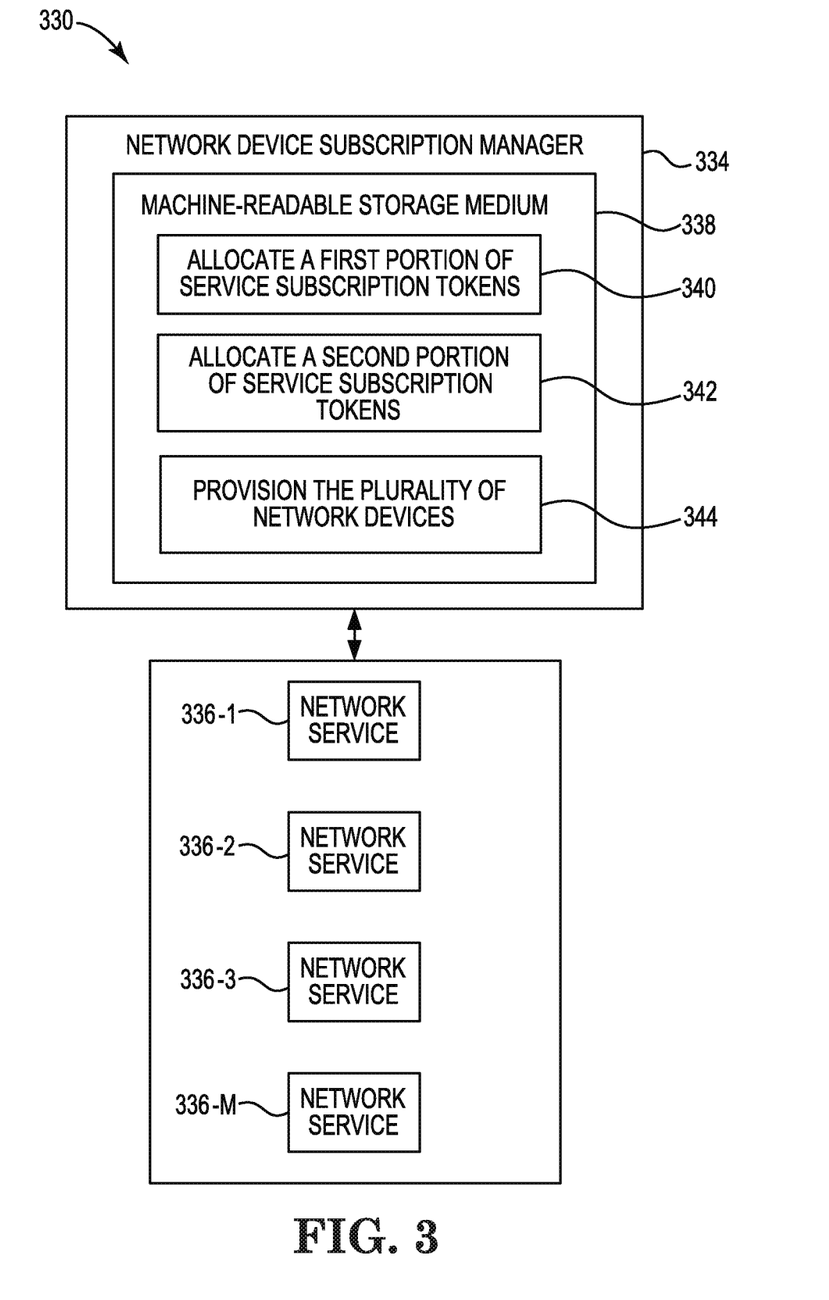
FIG. 3 illustrates an example system, consistent with the present disclosure.

FIG. 3 illustrates an example system 330, consistent with the present disclosure. As illustrated in FIG. 3, the system 330 may include a plurality of components. For instance, the system 330 may include a plurality of network services 336-1, 336-2, 336-3 . . . 336-M (referred to collectively as network services 336) managed by the network device subscription manager 334. As described herein, each network service may be provisioned on a network device or a plurality of network devices. For instance, each network device may be provisioned on a network device such as an access point, an access switch, and a branch controller, among other network devices.

The network device subscription manager 334 may be communicatively coupled to the plurality of network devices, and the network device subscription manager may include a non-transitory machine readable medium 338 storing executable instructions. For instance, the network device subscription manager 334 may include instructions 340 executable to allocate a first portion of a plurality of service subscription tokens to a first device-service provisioning, as described in relation to FIGS. 2A and 2B. Similarly, the network device subscription manager 334 may include instructions 342 executable to allocate a second portion of the plurality of service subscription tokens to a second device-service provisioning, as described in relation to FIGS. 2A and 2B. Moreover, the network device subscription manager 334 may include instructions 344 executable to provision the plurality of network devices 332 according to the first device-service provisioning and the second device-service provisioning.

Moreover, in some examples, the network device subscription manager 334 may include instructions executable to maintain a total allocation of the plurality of service subscription tokens and a duration for the first device-service provisioning and the second device-service provisioning, as described in relation to FIGS. 2A and 2B. For example, the network device subscription manager 334 may include instructions executable to maintain the total service subscription tokens purchased by a user, a number of tokens used, etc. as illustrated in FIG. 2A. In some examples, the network device subscription manager 334 may terminate the first device-service provisioning at an expiration of the first portion of service subscription tokens. For instance, referring to FIG. 2A, the network device subscription manager may terminate any device-service provisioning associated with subscription key CN00000100 as of Jun. 28, 2020.

In some examples, the network device subscription manager 334 may include instructions executable to re-provision the plurality of network devices responsive to receipt of a third device-service provisioning corresponding to a third allocation of the plurality of service subscription tokens. For instance, as described in relation to FIGS. 2A and 2B, each service subscription token may be re-applied to a different network device and/or a different network service (e.g., among network services 336). In response to the re-application of a service subscription token (or a plurality of service subscription tokens), the network devices may be re-provisioned by network device subscription manager 334, as necessary.

Figure 4:
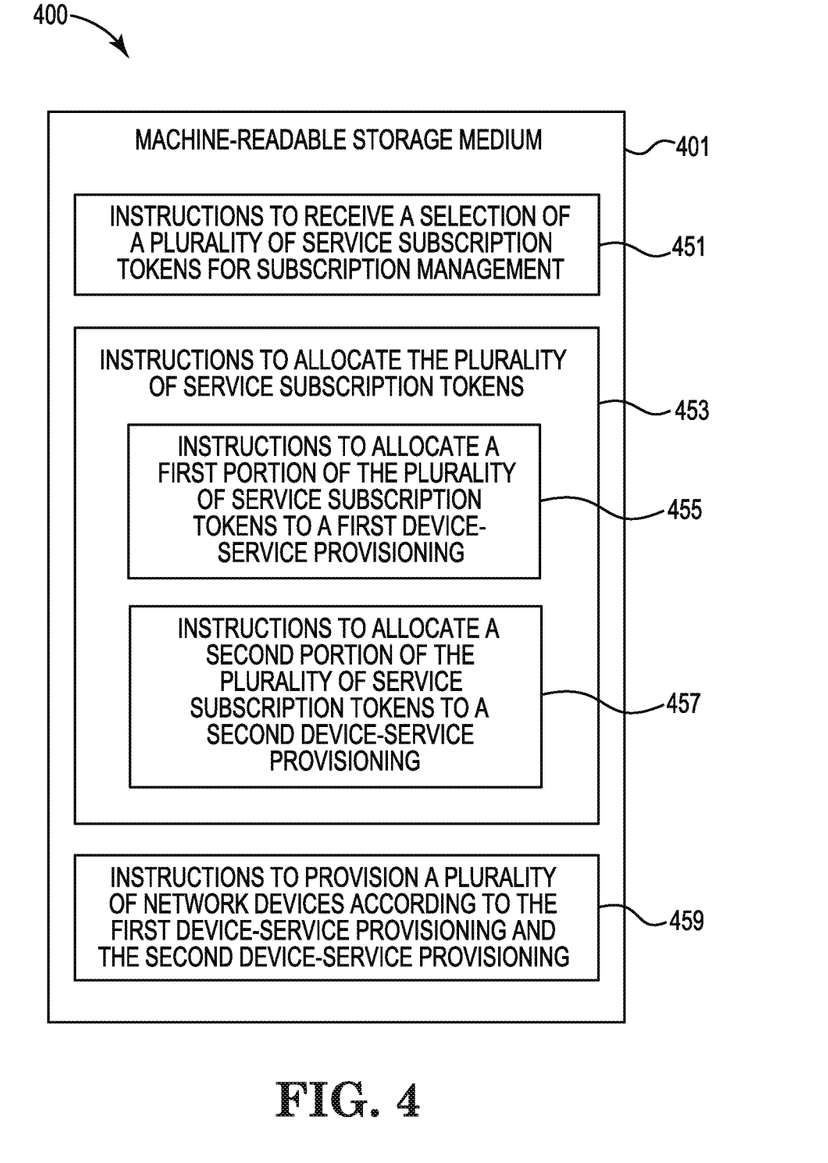
FIG. 4 further illustrates a block diagram of an example environment, consistent with the present disclosure.

FIG. 4 further illustrates a block diagram of an example environment 400, consistent with the present disclosure. The environment 400 may be analogous to the environment 100 illustrated in FIG. 1. Although the following descriptions refer to a single processor and a single machine-readable storage medium, the descriptions may also apply to a system with multiple processors and multiple machine-readable storage mediums. In such examples, the environment 400 may be distributed across multiple machine-readable storage mediums and multiple processors. Put another way, the instructions executed by the services controller may be stored across multiple machine-readable storage mediums and executed across multiple processors, such as in a distributed or virtual computing environment.

The environment 400 may include instructions 451 stored in the machine-readable storage medium 401 and executable by a processing resource to receive a selection of a plurality of service subscription tokens for subscription management. For example, as discussed in relation to FIGS. 2A and 2B, unused service subscription tokens may be assigned to particular network devices and/or network services, as described herein. Similarly, service subscription tokens that were previously assigned to a particular network device and/or network service may be re-provisioned, as described herein.

The environment 400 may include instructions 453 stored in the machine-readable storage medium 401 and executable by a processing resource to allocate the plurality of service subscription tokens. For instance, the instructions 453 may include instructions 455 to allocate a first portion of the plurality of service subscription tokens to a first device-service provisioning, and instructions 457 to allocate a second portion of the plurality of service subscription tokens to a second device-service provisioning. That is, a first device-service provisioning may include particular network services for a plurality of access points, and a second device-service provisioning may include particular network services for a plurality of switches. In such a manner, a first portion of the plurality of service subscription tokens may be used to "purchase" the first device-service provisioning, and the second portion of service subscription tokens may be used to "purchase" the second device-service provisioning.

In some examples, the instructions 453 to allocate the plurality of service subscription tokens may include instructions to generate a first subscription key for a first plurality of network device services deployed on a first plurality of network devices, and generate a second subscription key for a second plurality of network device services deployed on a second plurality of network devices, as described in relation to FIG. 2A. Also, as described in relation to FIGS. 2A and 2B, each subscription key, and therefore the first subscription key, may be valid for a defined term. However, as described herein, the environment 400 may include instructions to reallocate the first portion of the plurality of service subscription tokens for a remainder of the defined term, based on a third device-service provisioning. That is, referring to FIG. 2B, while 450 service subscription tokens may be used to provision the congestion diagnostics and connectivity analytics network services on 150 access points for 1 year, some or all of the 450 service subscription tokens may be reallocated to different network devices and/or different network services during that one year timeframe.

In some examples, the environment 400 may include instructions 459 stored in the machine-readable storage medium 401 and executable by a processing resource to provision a plurality of network devices according to the first device-service provisioning and the second device-service provisioning. Although example is provided herein to a first device-service provisioning and a second device-service provisioning, examples are not so limited. As described herein, to provision a network device refers to installing, preparing, and/or otherwise equipping a network device with instructions to allow it to provide particular network services. Moreover, as described herein, a device-service provisioning refers to an assignment of a particular network service to a particular network device. As such, a plurality of device-service provisioning assignments may be defined.

In some examples, the environment 400 may include instructions stored in the machine-readable storage medium 401 and executable by a processing resource to determine a first service subscription token value of the first device-service provisioning and a second service subscription token value of the second device-service provisioning, and determine a remainder of the plurality of service subscription tokens based on the first service subscription token value and the second service subscription token value. For example, as described in relation to FIGS. 2A and 2B, some network services may "cost" more than other network services, in terms of service subscription tokens. As such, a first device-service provisioning may have a different service subscription token value than a second device-service provisioning. A network device subscription manager, such as 334 illustrated in FIG. 3, may maintain a total number of service subscription tokens purchased by a user, a total number used, a total number available, and subscription keys used, as described in relation to FIG. 2A.

In some examples, the environment 400 may include instructions stored in the machine-readable storage medium 401 and executable by a processing resource to define a new network device service available for service subscription allocation, receive a new allocation of the plurality of service subscription tokens, wherein the first portion of the plurality of service subscription tokens are allocated to a third device-service provisioning that includes the new network device service. For example, as described in relation to FIG. 3, new services may become available to users of the network, and may subsequently be available for provisioning, as described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N" and "M", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A non-transitory machine readable medium storing instructions executable by a processor to cause the processor to:
receive a selection of a network device for subscription management from a user;
receive both a selection of an original service subscription for the network device and a duration of the service subscription from the user;
determine a service subscription token value based on a device hardware type associated with the selection of the network device, the service subscription, and the duration of the service subscription;
provision the network device with the service subscription for the duration responsive to allocation of the determined service subscription token value;
receive a selection of a modified service subscription for the network device during the duration of the original service subscription from the user; and
in response to the selection of the modified service subscription for the network device, provision the network device with the modified service subscription during the duration of the original service subscription.

2. The non-transitory machine readable medium of claim 1, including instructions to:
receive a selection of a plurality of different service subscriptions for a corresponding plurality of network services to be provisioned on the network device and a duration of each of the plurality of different service subscriptions; and
determine a combined service subscription token value for the plurality of different service subscriptions, wherein a first service subscription token value of the plurality of different service subscriptions is different than a second service subscription token value of the plurality of different service subscriptions.

3. The non-transitory machine readable medium of claim 1, wherein each service subscription token corresponds to a randomly generated subscription key that is valid for the duration of the service subscription.

4. The non-transitory machine readable medium of claim 1, wherein the service subscription comprises a first service subscription provisioned at a first time point, the medium including instructions to:
receive a selection of a second service subscription for the network device at a second time point subsequent to the first time point;
apply the allocation of the service subscription token value to the second service subscription instead of the first service subscription for a remainder of the duration; and
provision the network device for the second service subscription.

5. The non-transitory machine readable medium of claim 1, wherein the network device comprises a first network device, the medium including instructions to:
receive a selection of a second network device for subscription management;
apply the allocation of the service subscription token value to the second network device instead of the first network device; and
provision the second network device for the service subscription for a remainder of the duration.

6. The non-transitory machine readable medium of claim 1, wherein the instructions to provision the network device include instructions to:
prepare the network device to provide a network service associated with the service subscription.

7. A system for subscription management comprising:
a plurality of network services managed by a network device subscription manager; and
a network device subscription manager communicatively coupled to a network device, wherein the network device includes one of an access point, an access switch, or a branch controller, the network device subscription manager including a non-transitory machine readable medium storing instructions executable to:
receive a selection of a network device for subscription management from a user;
receive both a selection of an original service subscription for the network device and a duration of the service subscription from the user;
determine a service subscription token value based on a device hardware type associated with the selection of the network device, the service subscription, and the duration of the service subscription;
provision the network device with the service subscription for the duration responsive to allocation of the determined service subscription token value;
receive a selection of a modified service subscription for the network device during the duration of the original service subscription from the user; and
in response to the selection of the modified service subscription for the network device, provision the network device with the modified service subscription during the duration of the original service subscription.

8. The system of claim 7, wherein the network device subscription manager is to maintain information about a total allocation of the plurality of service subscription tokens and a duration for the first device-service provisioning and the second device-service provisioning.

9. The system of claim 7, wherein the network device subscription manager is to terminate the first device-service provisioning at an expiration of the first portion of service subscription tokens.

10. The system of claim 9, wherein the network device manager is to provision the network device by:
preparing the network device to provide a first network service associated with the first device-service provisioning; and
preparing the network device to provide a second network service associated with the second device-service provisioning.

11. The system of claim 9, wherein the network device manager is to:
   receive a selection of a second network device for subscription management;
   apply the allocation of the service subscription token value to the second network device instead of the first network device; and
   provision the second network device for the service subscription for a remainder of the duration.

12. The system of claim 7, wherein the first device-servicing provision is for one of congestion diagnostics network service and connectivity and analytics network service.

13. The system of claim 7, wherein the first device-servicing provision is for congestion diagnostics network service and wherein the second device-servicing provision is for connectivity analytics network service.

14. The system of claim 7, wherein the network device subscription manager further stores the instructions executable to:
   allocate a first portion of a plurality of service subscription tokens to a first device-service provisioning;
   allocate a second portion of the plurality of service subscription tokens to a second device-service provisioning; and
   provision the network device according to the first device-service provisioning and the second device-service provisioning.

15. A system for subscription management comprising:
   a plurality of network services managed by a network device subscription manager; and
   a network device subscription manager communicatively coupled to a network device, the network device subscription manager including a non-transitory machine readable medium storing instructions executable to:
      allocate a first portion of a plurality of service subscription tokens to a first device-service provisioning that provisions a first service to a network device;
      allocate a second portion of the plurality of service subscription tokens to a second device-service provisioning that provisions a second service to the network device; and
      provision the network device according to the first device-service provisioning and the second device-service provisioning;
   receive a selection of a modified service subscription from a user for the network device during a duration corresponding to the provisioned first service; and
   in response to the selection of the modified service subscription for the network device, re-provision the network device with the modified service subscription during the duration corresponding to the provisioned first service, wherein the network device subscription manager is to re-provision the network device with a third service while stopping the first service on the network device.

16. The system of claim 15, wherein the first device-servicing provision is for one of congestion diagnostics network service and connectivity and analytics network service.

17. The system of claim 15, wherein the first device-servicing provision is for congestion diagnostics network service and wherein the second device-servicing provision is for connectivity analytics network service.

* * * * *